United States Patent [19]

Taylor et al.

[11] Patent Number: 5,292,212
[45] Date of Patent: Mar. 8, 1994

[54] APPARATUS FOR POSITIONING A GEAR BLANK

[75] Inventors: Lowes J. Taylor, East Peoria; Joseph R. Pesha, Manito; Charles E. Lindsey, Middletown; David B. Swigart, Washington, all of Ill.

[73] Assignee: Caterpillar Inc., Peoria, Ill.

[21] Appl. No.: 43,084

[22] Filed: Apr. 5, 1993

[51] Int. Cl.⁵ .................... B23F 23/12; G01B 5/00
[52] U.S. Cl. .................. 409/61; 33/501.14; 407/21; 409/25
[58] Field of Search .............. 409/61, 25, 26, 27, 409/28, 39, 40, 51; 33/501.7, 501.12, 501.13, 501.14, 501.15, 501.16, 501.17, 501.18, 501.19, 626, 628, 629, 640, 555; 51/287, 105 GG; 407/21

[56] References Cited

U.S. PATENT DOCUMENTS

| | | | |
|---|---|---|---|
| 2,139,154 | 12/1938 | Galloway | 409/61 |
| 2,150,313 | 3/1939 | Bauer | 409/61 X |
| 2,433,468 | 12/1947 | Mackmann et al. | 33/501.7 X |
| 3,099,883 | 8/1963 | Bergemann et al. | 33/501.14 X |
| 3,368,455 | 2/1968 | Ellwanger | 409/61 |
| 3,641,431 | 2/1972 | Pigage et al. | 33/555 X |
| 4,128,945 | 12/1978 | Barritt | 409/61 X |
| 4,169,691 | 10/1979 | Flair | 33/501.13 X |
| 4,512,694 | 4/1985 | Foran et al. | 409/51 X |
| 5,133,627 | 7/1992 | Lindsey | 409/261 |

FOREIGN PATENT DOCUMENTS

| | | | |
|---|---|---|---|
| 1182025 | 11/1964 | Fed. Rep. of Germany | 33/501.14 |
| 2744562 | 4/1979 | Fed. Rep. of Germany | 33/501.15 |
| 1326180 | 3/1963 | France | 409/61 |
| 44660 | 4/1977 | Japan | 33/501.14 |
| 435905 | 12/1974 | U.S.S.R. | 409/61 |
| 1717299 | 3/1992 | U.S.S.R. | 409/25 |

*Primary Examiner*—William Briggs
*Attorney, Agent, or Firm*—Kenneth A. Rhoads

[57] ABSTRACT

An apparatus for positioning a gear blank on a workpiece spindle of a gear generating machine. An indicating element orientates cutter blades of a milling cutter of a gear generating machine relative to a gear blank and rough cut teeth of the gear blank.

10 Claims, 3 Drawing Sheets

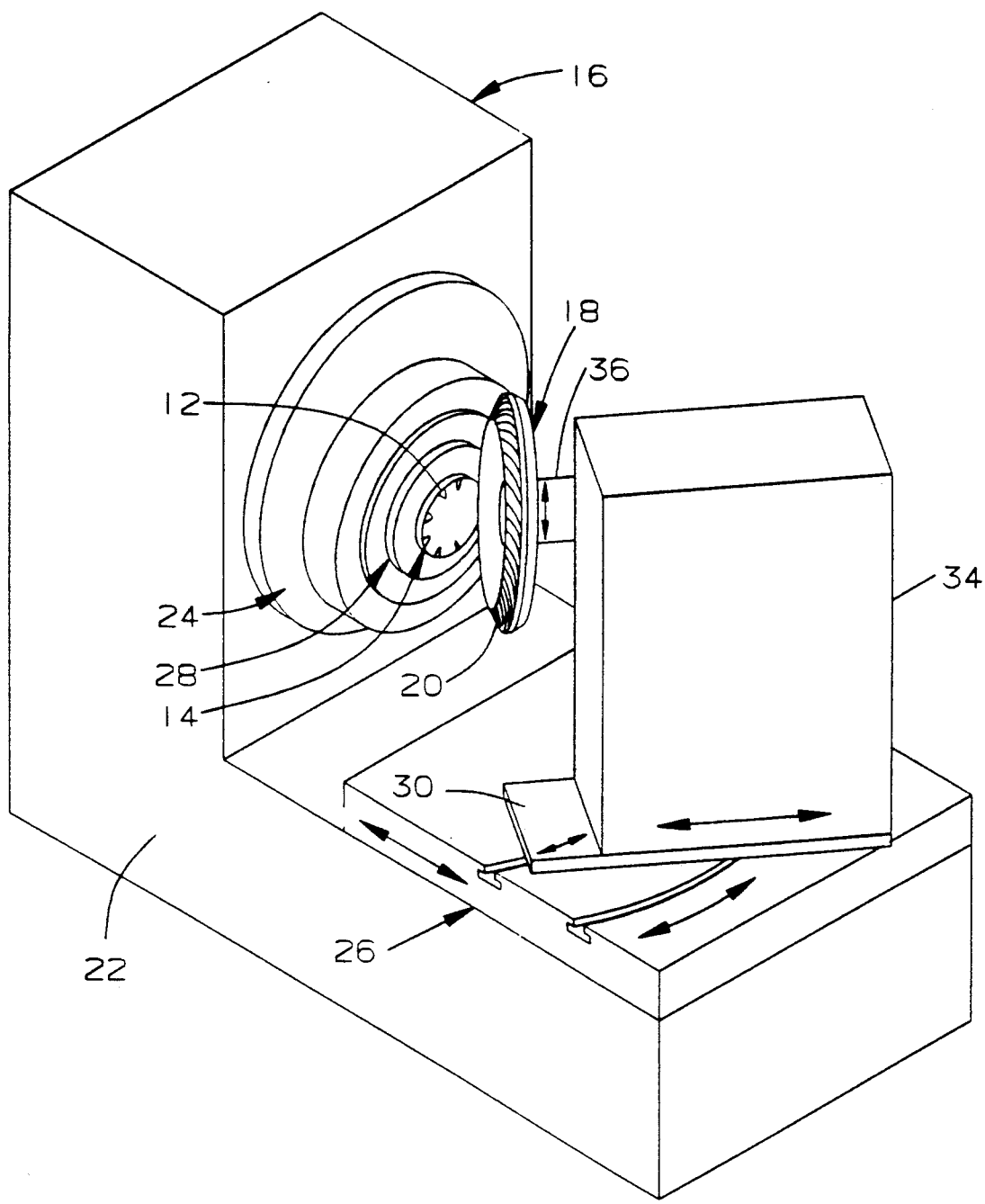
Fig_1_

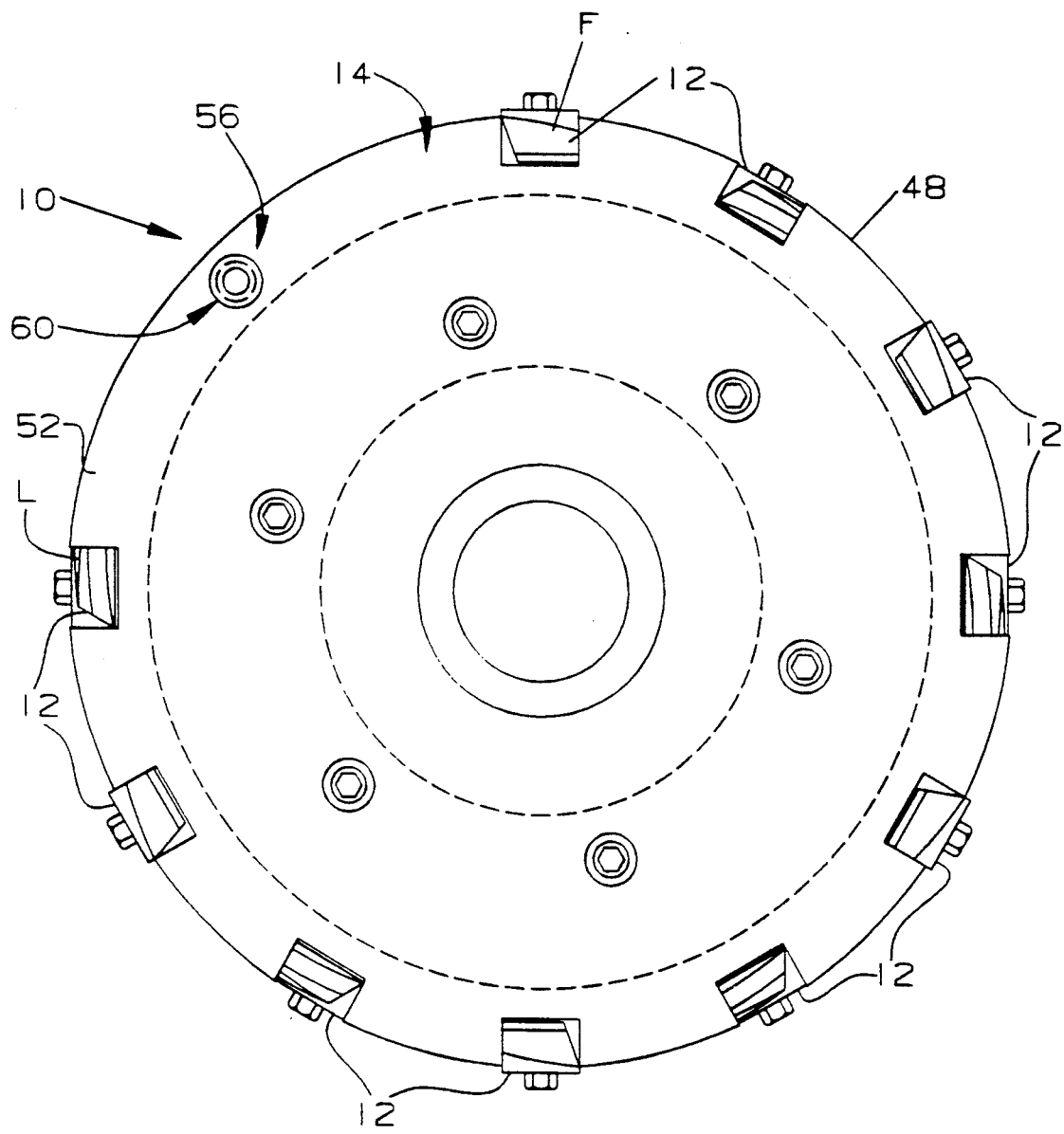
Fig_2_

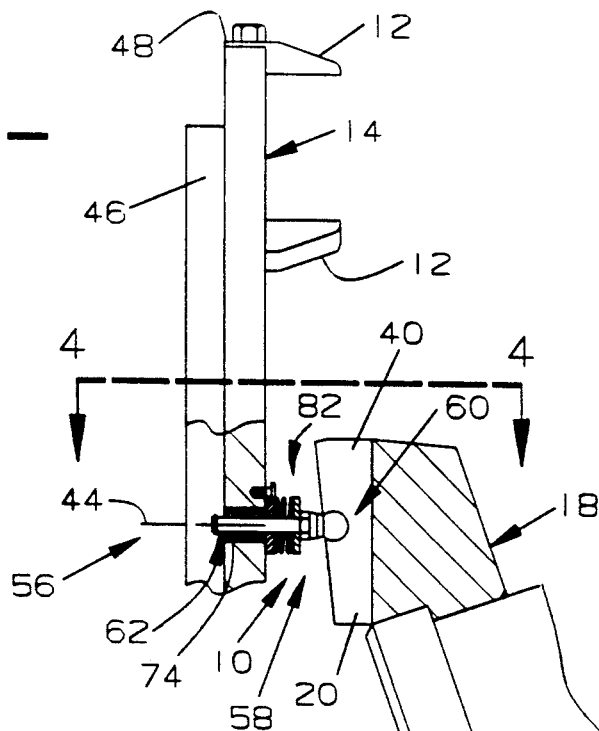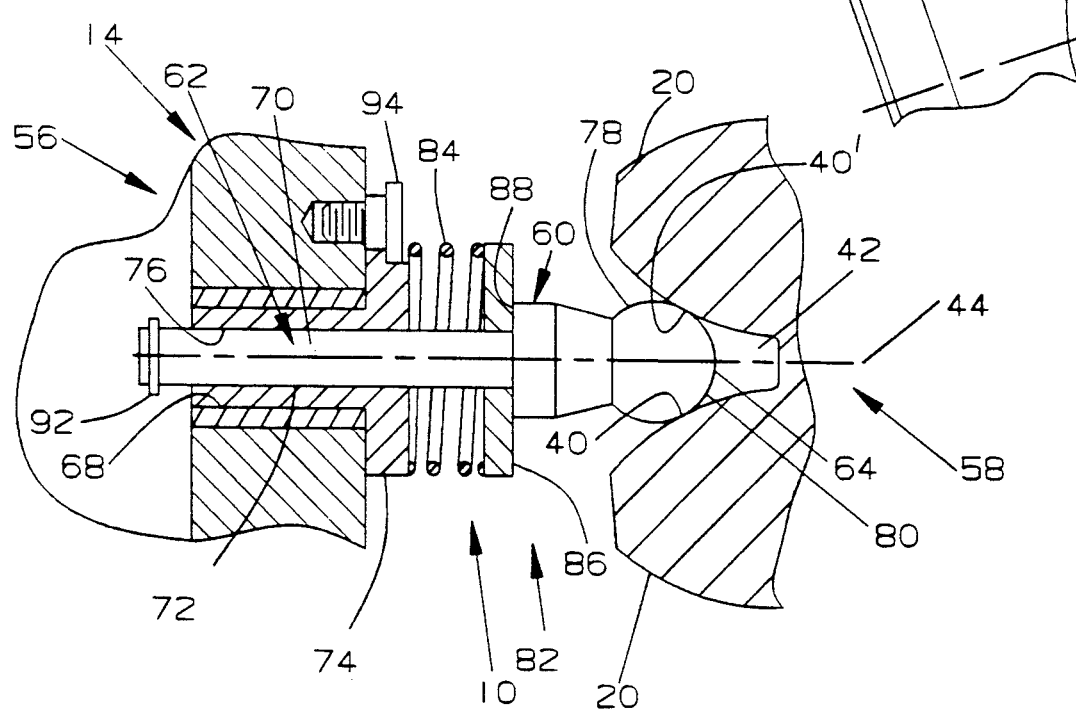

APPARATUS FOR POSITIONING A GEAR BLANK

TECHNICAL FIELD

This invention relates generally to an apparatus for positioning a gear blank having rough cut teeth on a workpiece spindle of a gear generating machine. More specifically, this invention relates to an indicating element for orientating the cutter blades of a milling cutter relative the rough cut gear blank teeth.

BACKGROUND ART

The flank surfaces of spiral bevel gear teeth are typically finish machined on a gear generating machine by a rotary milling cutter. An example of a gear generating machine is illustrated in U.S. Pat. No. 5,133,627 which issued to C. E. Lindsey on Jul. 28, 1992. The rotary milling cutter has its tooth cutters arranged only partway around its periphery with a gap between the last and first tooth blades. The finish-cutting operation is effected by rotating the milling cutter continuously, holding the gear blank stationary while the blades of the cutter pass through the valley or space between adjacent gear teeth and indexing the gear blank when the gap in the cutter is abreast of the gear blank. The indexing operation must be timed very closely to the rotation of the cutter and the gear blank must be positioned very accurately on the workpiece spindle so that the blades of the cutter will enter the space between the teeth and remove preselected portions of material from the teeth.

Orientation of the tooth cutters of the milling cutter to the rough cut teeth and specifically the space between the teeth is critical since only a small amount of material is generally removed during the finish operation. Considerable time and effort is required to establish the initial position of the gear blank on a workpiece spindle of the gear generating machine at the time of initial "set up". A gear blank is mounted on the workpiece spindle leaving a workpiece chuck unclamped whereupon the gear blank is slowly moved into the tooth cutters with the tooth cutters being centered as best as possible in the space between adjacent gear teeth. To effect this centering, the gear blank is repeatedly rotated slightly on the work piece spindle until the cutter blades are preferably centered in the space between the gear teeth and generally equal amount of material is removed from each tooth flank. Typically twenty to thirty minutes may be required to precisely center the cutter blades in the space resulting in increased customer cost and greater possibility of cutter or piece part damage.

A stock divider device is then used to duplicate the position for succeeding gear blanks on the workpiece spindle after the relative position of the cutting blades to the rotary cutter has been established. Stock dividing devices have balls or fingers which are adapted to engage opposed tooth flank surfaces of the teeth. Examples of such devices are shown in U.S. Pat. No. 2,139,154 which issued to C. T. Galloway on Dec. 6, 1938 and U.S. Pat. No. 3,368,455 which issued on Feb. 13, 1968 to C. G. Ellwanger.

Accordingly, what is needed is an apparatus to quickly, easily, and precisely initially orientate the cutter blades of a milling cutter relative to rough cut teeth of a gear blank. The subject invention provides this function and represents a savings of equipment, labor, and natural resources.

The present invention is directed to overcome one or more of the problems as set forth above.

DISCLOSURE OF THE INVENTION

In one aspect of the invention, an apparatus is provided for orientating cutter blades of a milling cutter of a gear generating machine. The cutter blades cutters and milling cutter are orientated relative to a gear blank and rough cut teeth of the gear blank. Adjacent rough cut teeth of the gear blank each have an adjacent flank defining an intervening space. The milling cutter has a mounting area located at a preselected position thereon. The gear blank has a preselected orientation area. An indicating element has first and second end portions. The first end portion is connectable to the mounting area and the second end portion is alienable with the orientation area.

BRIEF DESCRIPTION OF THE DRAWINGS

FIG. 1 is a diagrammatic perspective view of a typical gear generating machine of the general type used to finish machine spiral bevel gears;

FIG. 2 is a diagrammatic plan view of a rotary cutter with the apparatus of this invention;

FIG. 3 is a diagrammatic fragmentary and enlarged partial side view of the rotary cutter and a spiral bevel gear with the apparatus of this invention; and FIG. 4 is a diagrammatic enlarged view of the preferred apparatus of this invention taken in the direction of the arrows 4—4 in FIG. 3.

BEST MODE FOR CARRYING OUT THE INVENTION

Referring to FIGS. 1, 2, 3, and 4, an apparatus 10 is used for orientating plurality of spaced apart insert cutter blades 12 of a milling cutter 14 of a gear generating machine 16. The cutter blades 12 and milling cutter 14 are orientated relative to a gear blank 18 and rough cut teeth 20 of the gear blank 18 during the initial "set-up" of the gear generating machine 16.

FIG. 1 illustrates the gear generating machine 16 of the general class for making spiral bevel gears and is well known in the art. The gear generating machine 16 includes a main frame 22 for supporting a cradle 24 and a sliding base 26 adjustably mounted for movement in a longitudinal direction. The cradle 24 supports a cutter spindle 28 in an eccentric manner thereon. It is recognized that the gear generating machine 16 may be of the rectilinear motion generating type.

A work head platform 30 is suitably supported on the sliding base 26 for pivotal movement. A work head 34 is subsequently linearly adjustably mounted on the work head platform 30 to provide an adjustable head setting in a conventional manner. A workpiece spindle and chuck 36 is adjustably mounted for vertical movement on the work head 34. The workpiece spindle and chuck 36 positions and holds the gear blank 18 already having the plurality of rough-cut teeth 20. As best shown in FIG. 4, the adjacent rough-cut teeth 20 of the gear blank 18 each have an adjacent flank surface 40,40' defining an intervening valley or space 42 having a centerline 44.

Referring to FIGS. 2, 3, and 4 the circular cutting tool or milling cutter 14 has a body 46 and an outer peripheral surface 48. The cutter blades 12 are mounted on the cutter spindle 28 in a conventional manner. In a specific example, there are ten cutter blades 12 on the milling cutter 14. The cutter blades 12 are arranged only part-way around the outer peripheral surface 48 of the milling cutter 14 with a gap 52 of approximately 90 degrees between a first tooth cutter "F" and a last tooth cutter "L".

The tooth cutters 12 of the milling cutter 14 must be carefully orientated relative to the teeth 20 of the rough cut gear blank 18 in the finish operation of a rough cut gear blank 18, as is well known in the art. Therefore, the preselected mounting area and preselected orientation must be located at precise circumferential locations aligned relative to each other, as is also well known in the art.

The milling cutter 14 has a preselected mounting area 56 located at a preselected position thereon and the gear blank has a preselected orientation area 58. The apparatus 10 includes an indicating element 60 having first and second end portions 62,64. The first end portion 62 is connectable to the mounting area 56 and the second end portion 60 is alienable with the orientation area 58.

In the preferred embodiment, as shown in FIGS. 2, 3, and 4, the preselected position of mounting area 54 is on the milling cutter 14 at a preselected radial position sufficient for following the centerline 44 of a space 42 of the rough-cut teeth 20 in the operable, rotating condition of the milling cutter 14 relative to the gear blank 18. The preselected position of the mounting area 54 in this specific instance, is located in the gap between the first and last tooth cutters 12. The preselected orientation area 58 is the centerline 44 of a space 42.

The mounting area 56 of the milling cutter 14 is defined by an opening 68 in the milling cutter 14 and the first end portion 62 of the indicating element 60 is a shaft 70 having an end 72 of a dimension sufficient for insertion into the opening 68 of the milling cutter 14 and removable therefrom. A hardened bushing 74 is disposed in the opening 68 and the bushing 74 defines a passage 76 and the shaft 70 is reciprocally mounted in the passage 76.

The second end portion 64 of the indicating element 60 is of a spherical configuration 78 having a diameter less than the maximum width of a space 42 and greater than the minimum width of the space 42 of rough cut teeth 20. The spherical configuration 78 in the preferred embodiment is a ball 80 cradled in the intervening space 42 between adjacent teeth 36 and engages the opposing flank surfaces 40,40' of the adjacent teeth 20 with the center of the ball 80 aligned with the orientation area 58 i.e., the centerline 44 of the rough cut space 40.

The indicating element 60 is movable between a first position at which the shaft end 72 is at a first location within the milling cutter 14 and a second position at which the shaft end 72 is positioned within the milling cutter 14 at a location spaced from the first position in a direction toward the second end of the indicating element 60.

The indicating element 60 includes means 82 for biasing the indicator element 60 towards the second position. The indicating element 60 is moveable towards the first position in response to engagement of the ball 80 with the opposing flank surfaces 40,40'. The means 82 includes a coil spring 84 and a washer 86. The washer 86 is disposed about the shaft 70 and in abutment with a shoulder 88 of the ball 80. The spring 84 is disposed between the washer 86 and the bushing 74. The indicating element 60 is retained in the passage 76 of the bushing 74 by a snap ring 92. The bushing 74 is retained in the opening 68 of the milling cutter 14 by a shoulder screw 94 in a conventional manner.

INDUSTRIAL APPLICABILITY

During the initial "set-up" of the gear generating machine 16, the rough-cut gear blank 18 is installed, but not clamped, on the workpiece spindle and chuck 36 and the milling cutter 14 is installed on the cutter spindle 28. A series of linear and angular measurements are programmed into the gear generating machine 16 by the operator to provide the desired machine cuts in a conventional manner. In the preferred embodiment illustrated in FIGS. 2, 3, and 4, the apparatus 10 is installed in the opening 68 of the milling cutter 14 at the preselected position of the mounting area. The sliding base 26 of the gear generating machine 16 is then moved toward the milling cutter 14 bringing one of the spaces 42 of the gear blank 18 into general alignment with the ball 80 of the indicating element 60. The gear blank 18 is then rotated until the ball 80 is cradled in the space 42 and in contact with the adjacent flank surfaces 40,40' thereby centering the space precisely with the indicating element 60. The gear blank 18 is then clamped to the workpiece spindle and chuck 36 whereupon the stock divider device is set to duplicate the position for succeeding gear blanks 18 in a conventional manner. After the position of the gear blank 18 has been established, the apparatus 10 is removed from the milling cutter 44.

The preselected position of the apparatus 10 is on the milling cutter 14 at a preselected radial position sufficient for following a centerline 44 of a space 42 of the rough cut teeth 20 in the operable, rotating condition of the milling cutter 14 relative to the gear blank 18. This insures quick, easy, and precise orientation of the tooth cutters 50 relative to the teeth 36 of the rough cut gear blank 34.

Other aspect, objects, and advantages of this invention can be obtained from a study of the drawings, the disclosure and the appended claims.

We claim:

1. An apparatus for orienting cutter blades of a milling cutter of a gear generating machine, said cutter blades and milling cutter being orientated relative to a gear blank and rough-cut teeth of the gear blank, adjacent rough-cut teeth of said gear blank each having an adjacent flank defining an intervening space having a centerline, comprising:
   one of said milling cutter and gear blank having a mounting area located at a preselected position thereon;
   the other of said milling cutter and gear blank having a preselected orientation area;
   an indicating element having first and second end portions, said first end portion being connectable to said mounting area and said second end portion being alignable with said orientation area.

2. The apparatus as set forth in claim 1, wherein the preselected position of the mounting area is on the milling cutter at a preselected radial position sufficient for following a centerline of a space of the rough cut teeth in the operable, rotating condition of the milling cutter relative to the gear blank.

3. The apparatus as set forth in claim 1, wherein the preselected orientation area is the centerline of a space of the rough cut gear.

4. The apparatus as set forth in claim 1, wherein the second end portion of the indicating element is of a spherical configuration having a maximum diameter less than the maximum width of a space and greater than the maximum width of a space of the rough cut gear.

5. The apparatus as set forth in claim 1, wherein the mounting area of the milling cutter is defined by an opening in the milling cutter and the first end portion of the indicating element is a shaft having an end of a dimension sufficient for inserting into the opening of the milling cutter and removable therefrom.

6. The apparatus as set forth in claim 5, wherein the indicating element is moveable between a first position at which the shaft end is at a first location within the milling cutter and a second position at which the shaft end is positioned within the milling cutter at a location spaced from said first position in a direction toward said second end of said indicating element.

7. The apparatus as set forth in claim 5, wherein the indicating element includes means for biasing the indicating element toward the second position.

8. The apparatus as set forth in claim 7, wherein a bushing is disposed in the opening and the bushing defines a passage and the shaft is reciprically mounted in the passage.

9. The apparatus as set forth in claim 8, wherein the means for biasing includes a coil spring and a washer, said washer is disposed about the shaft and said spring is disposed between the washer and the bushing.

10. The apparatus as set forth in claim 8, wherein the indicating element is retained in the passage of the bushing by a snap ring.

* * * * *